(12) United States Patent
Zarudniev et al.

(10) Patent No.: US 12,123,969 B2
(45) Date of Patent: Oct. 22, 2024

(54) GENERATOR OF A FREQUENCY MODULATED RADAR SIGNAL

(71) Applicant: COMMISSARIAT A L'ENERGIE ATOMIQUE ET AUX ENERGIES ALTERNATIVES, Paris (FR)

(72) Inventors: Mykhailo Zarudniev, Grenoble (FR); Etienne Antide, Grenoble (FR); Cédric Dehos, Grenoble (FR); José-Luis Gonzalez Jimenez, Grenoble (FR); Clément Jany, Grenoble (FR); Alexandre Siligaris, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 244 days.

(21) Appl. No.: 17/406,265

(22) Filed: Aug. 19, 2021

(65) Prior Publication Data
US 2022/0057479 A1    Feb. 24, 2022

(30) Foreign Application Priority Data
Aug. 20, 2020 (FR) ..................... 20 08588

(51) Int. Cl.
*G01S 7/35* (2006.01)
*G01S 13/34* (2006.01)

(52) U.S. Cl.
CPC ............ *G01S 7/35* (2013.01); *G01S 13/343* (2013.01)

(58) Field of Classification Search
CPC .................................. G01S 7/35; G01S 13/343
See application file for complete search history.

(56) References Cited

U.S. PATENT DOCUMENTS

2010/0073222 A1* 3/2010 Mitomo .................. G01S 7/35
                                                                342/175
2010/0226450 A1* 9/2010 Tanaka .................. H04L 25/06
                                                                375/317
(Continued)

FOREIGN PATENT DOCUMENTS

FR        3 100 404 A1    3/2021

OTHER PUBLICATIONS

Liu et al. "An Ultralow Power Burst-Chirp UWB Radar Transceiver for Indoor Vital Signs and Occupancy Sensing in 40-nm CMOS", IEEE Solid-State Circuits Letters, IEEE, vol. 2, No. 11, pp. 256-259, Nov. 1, 2019 (Year: 2019).*
(Continued)

Primary Examiner — Vladimir Magloire
Assistant Examiner — Noah Yi Min Zhu
(74) Attorney, Agent, or Firm — Oblon, McClelland, Maier & Neustadt, L.L.P.

(57) ABSTRACT

A generator of a frequency modulated radar signal includes a generator of a periodic signal frequency modulated over a part $T_{ramp}$ of a period T, corresponding to a square signal of which the frequency varies linearly in a first frequency band $B_{in}$ of central frequency $f_{in}$; an oscillator generating a sinusoidal signal of frequency $f_c > f_{in}$ and included in a second frequency band $B_{amp} > B_{in}$ and corresponding to the linear variation of the frequency of the radar signal; and means coupled to an electrical supply input of the oscillator such that they generate a voltage for supplying the oscillator at the frequency of the frequency modulated periodic signal.

14 Claims, 6 Drawing Sheets

(56) References Cited

U.S. PATENT DOCUMENTS

2021/0067400 A1    3/2021   Lachartre
2021/0175850 A1*   6/2021   Yin ........................ H03L 7/099

OTHER PUBLICATIONS

Bui et al. "Design of a High-Speed Differential Frequency-to-Voltage Converter and Its Application in a 5-GHz Frequency-Locked Loop," in IEEE Transactions on Circuits and Systems I: Regular Papers, vol. 55, No. 3, pp. 766-774, Apr. 2008 (Year: 2008).*

Carlowitz et al. "A Low Power Pulse Frequency Modulated UWB Radar Transmitter Concept Based on Switched Injection Locked Harmonic Sampling," 2012 The 7th German Microwave Conference, Ilmenau, Germany, 2012, pp. 1-4 (Year: 2012).*

M. Vossiek and P. Gulden, "The Switched Injection-Locked Oscillator: A Novel Versatile Concept for Wireless Transponder and Localization Systems," in IEEE Transactions on Microwave Theory and Techniques, vol. 56, No. 4, pp. 859-866, Apr. 2008, doi: 10.1109/TMTT.2008.918158. (Year: 2008).*

French Preliminary Search Report issued Apr. 28, 2021 in French Application 20 08588 filed on Aug. 20, 2020, 2 pages (with English Translation of Categories of Cited Documents).

Carlowitz et al., "A low power Pulse Frequency Modulated UWB radar transmitter concept based on switched injection locked harmonic sampling", Microwave Conference (GEMIC), Mar. 12, 2012, 4 pages.

Liu et al., "An Ultralow Power Burst-Chirp UWB Radar Transceiver for Indoor Vital Signs and Occupancy Sensing in 40-nm CMOS", IEEE Solid-State Circuits Letters, vol. 2, No. 11, Nov. 1, 2019, 4 pages.

Liu et al., "9.3 A680μW Burst-Chirp UWB Radar Transceiver for Vital Signs and Occupancy Sensing up to 15m Distance", IEEE International Solid-State Circuits Conference, Feb. 19, 2019, 3 pages.

Banerjee et al., "Millimeter-Wave Transceivers for Wireless Communication, Radar, and Sensing", IEEE, 2019, 11 pages.

Yen et al. "Low-Power and High-Frequency Ring Oscillator Design in 65nm CMOS Technology", IEEE, 2017, 4 pages.

Cherniak et al., "A 23-GHz Low-Phase-Noise Digital Bang-Bang PLL for Fast Triangular and Sawtooth Chirp Modulation", IEEE Journal of Solid-State Circuit, vol. 53, No. 12, Dec. 2018, 11 pages.

Jany: "Conception et étude d'une synthèse de fréquence innovante en technologies CMOS avancées pour les applications en bande de fréquence millimétrique" (Thesis-Chapter 4), 2014, 40 pages.

* cited by examiner

GENERATOR OF A FREQUENCY MODULATED RADAR SIGNAL

TECHNICAL FIELD

The invention relates to the field of architectures for generating frequency modulated signals, or waves, for radar applications, notably short range radar, which corresponds to detections made for distances for example less than 100 m, used notably in the automobile field (for example for distance regulation radars, also called ACC (adaptive cruise control) radars), in that of surveillance and defence, in aeronautics, for gesture recognition or the production of human-machine interfaces, or instead the field of the measurement and the surveillance of vital signs (heartbeat and respiration), etc.

PRIOR ART

FMCW (frequency modulated continuous waveform) type radars are well suited to the production of short range radars on account of the waves sent by this type of radar which are sinusoidal, which makes it possible to obtain signals of good power.

Figure 1:
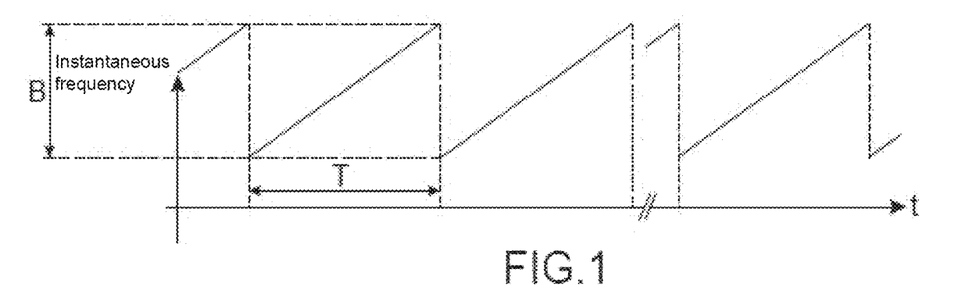
FIG. 1 shows the temporal variation of the instantaneous frequency of a signal sent by a FMCW type radar.

FIG. 1 shows the temporal variation of the instantaneous frequency of a signal sent by a FMCW type radar. Such a signal is for example generated from a local oscillator, and corresponds to a sinusoidal signal of which the instantaneous frequency varies linearly, over each period T, in a frequency band B. This linear variation of the instantaneous frequency of the signal forms a ramp repeated periodically at the period T and of which the slope is defined by a parameter α representative of the rapidity of the frequency excursion of the signal over a fixed time. This parameter a corresponds to the tangent of the angle formed by the ramp with respect to the time axis, and is expressed in GHz/μs. The greater the value of the parameter α, the more the variation of the instantaneous frequency of the signal over the frequency band B is obtained rapidly (that is to say the more T will be small) or, for a fixed duration T, the wider the frequency band B.

One of the key elements of any radar signal transmission device is the signals generator used for the transmission of radar waves. This generator must be dimensioned in such a way as to respond to the need for very fine spatial resolution in distance ΔR of the radar enabling it to distinguish different targets close to one another. This resolution ΔR is typically several centimetres, which may be obtained while guaranteeing a high frequency band B, of the order of at least 1 GHz. To the first order, the spatial resolution in distance ΔR may be expressed by the equation:

$$\Delta R \sim \frac{c}{2B}$$

Thus, the wider the frequency band B, the better will be the separating power of the radar between two objects detected by the radar. As an example, a frequency band B=1 GHz makes it possible to obtain a resolution ΔR of the order of 0.15 m, and a frequency band B=2 GHz makes it possible to obtain a resolution ΔR of the order of 0.075 m.

The frequency band B is scanned by the radar signal during the period T of which the value is defined by the targeted radar application. Reducing the duration necessary for the radar signal to vary its instantaneous frequency over the whole frequency band B while not reducing the frequency band B makes it possible, over a same period T, to integrate a greater number of signals (which corresponds to having several ramps in a single period T), for example to carry out an operation of coherent integration on reception.

In order to reduce the electrical consumption of the radar signals generator, it is possible to generate a radar signal having a non-zero amplitude over a part only of the period T, during which the instantaneous frequency of the radar signal varies over all the frequency band B, and having a zero value over the remainder of the period T, which makes it possible to switch off the generator during the remainder of the period T. The radar signal is thus generated with a duty cycle D less than 1 (or less than 100%). The document of Y. Liu et al., "9.3 A680 μW Burst-Chirp UWB Radar Transceiver for Vital Signs and Occupancy Sensing up to 15 m Distance," 2019 IEEE International Solid-State Circuits Conference—(ISSCC), San Francisco, CA, USA, 2019, pp. 166-168, describes such an exemplary embodiment of a radar signals generator.

Figure 2:
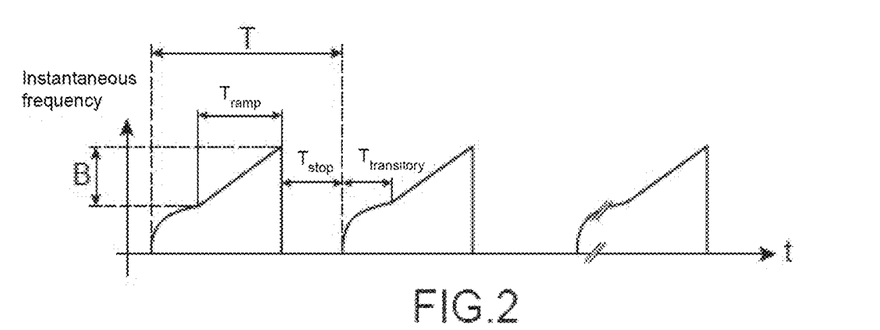
FIG. 2 shows the temporal variation of the instantaneous frequency of a FMCW type radar signal having a duty cycle D less than 1.

FIG. 2 shows the temporal variation of the instantaneous frequency of an FMCW type radar signal having a duty cycle D less than 1.

During each period T, and due to the fact that the generator is stopped during a part of each period T, the radar signal generated goes through a settling phase, which corresponds to the start-up of the generator, during which the instantaneous frequency of the radar signal does not change linearly over time. This settling phase has a duration called $T_{transitory}$. During this settling phase, the radar signal is not exploitable and the radar does not carry out a measurement. The duration during which the instantaneous frequency of the radar signal varies linearly over the frequency band B is called $T_{ramp}$ and corresponds to the duration of the measurement carried out by the radar. Finally, the duration during which the signal has a zero amplitude, which corresponds to the phase during which the energy saving is made thanks to the stoppage of the generator which consumes practically no more energy, apart from the leakage current, is called $T_{stop}$.

In order to reduce as much as possible the electrical consumption of the radar waves generator, the duration $T_{stop}$ must be the longest possible, and thus the durations $T_{ramp}$ and $T_{transitory}$ must be the shortest possible.

The value of the duty cycle D is defined by the equation:

$$D = \frac{T_{ramp}}{T_{ramp} + T_{transitory} + T_{stop}}$$

Current solutions make it possible to obtain a duty cycle D of around 3%, with a duration $T_{transitory}$ of the order of 10 μs, a duration $T_{ramp}$ comprised between 10 μs and 40 μs, a duration $T_{stop}$ of the order of 1.2 ms and a value of the parameter α comprised between 0.05 GHz/μs and 0.12 GHz/μs, for a frequency band B of 750 MHZ centred on a frequency of 8 GHz.

The document A. Banerjee et al., "Millimeter-Wave Transceivers for Wireless Communication, Radar, and Sensing: (Invited Paper)," 2019 IEEE Custom Integrated Circuits Conference (CICC), Austin, TX, USA, 2019, pp. 1-11, recapitulates the performances obtained with different types of radar signal generators. The values of a being able to be obtained, for a frequency band B greater than 1 GHZ, are comprised between 0.025 GHz/μs and 0.1667 GHz/μs.

The document of CHRISTIAN CARLOWITZ et al., "A low power Pulse Frequency Modulated UWB radar transmitter concept based on switched injection locked harmonic sampling", Microwave Conference (GEMIC), 2012 the 7th German, IEEE, 12 Mar. 2012, pages 1-4, describes the generation of a signal resorting to an oscillator generating a periodic signal of which the frequency varies linearly in the desired frequency band, and of which the output is periodically interrupted by a square signal. The radar signal generated may in this case be expressed by the relationship $x_{DDS}(t)=[\cos(2\pi f_{bb}t)\cdot III_T(t)]*\Pi(t/T)$ with $f_{bb}$ the base band frequency of the signal generated by the oscillator, III being a Dirac comb, $\Pi(t/T)$ a rectangular function and T the constant period of the square signal periodically interrupting the output of the oscillator. The solution described in this document forms a FMCW wave multiplier by one of the harmonics which is however strongly attenuated since the signal does not have properties of coherence at the desired frequency. Hence, the frequency multiplication using this solution is not interesting for carrying out high multiplication rates on the pass band of the FMCW signal.

The document of LIU YAO-HONG et al., "An Ultralow Power Burst-Chirp UWB Radar Transceiver for Indoor Vital Signs and Occupancy Sensing in 40-nm CMOS", IEEE Solid-State Circuits Letters, IEEE, vol. 2, n°11, 1st Nov. 2019, pages 256-259, describes the generation of a radar signal directly at the carrier frequency, here around 8 GHz. The use of this solution to generate a radar signal directly in the mmW band with the same properties would require the use of a frequency multiplier. However, the addition of such a multiplier would cause a distortion of the FMCW signal on account of the applied multiplication factor.

Minimising the value of $T_{ramp}$ while maximising the value of the frequency band B, that is to say maximising the value of the parameter a, would make it possible to obtain:
- a better signal to noise ratio (SNR) on reception of the signal thanks to the coherent integration of multiple frequency modulated pulses over a given duration, and/or
- a low usage rate of the signals generator, that is to say the possibility of making the acquisition of the signal in a shorter time and then stopping the generator longer, which makes it possible to consume less energy.

DESCRIPTION OF THE INVENTION

Thus there is a need to propose a generator of a frequency modulated radar signal making it possible to improve the signal to noise ratio on reception of this signal and/or of which the electrical consumption is reduced.

To do so, one embodiment proposes a generator of a frequency modulated radar signal, comprising at least:
- a device for generating, or a generator of, a periodic signal frequency modulated over at least one part $T_{ramp}$ of a period T, corresponding, over the part $T_{ramp}$ of the period T, to a square signal of which the instantaneous frequency varies linearly over the totality of a first frequency band $B_{in}$ of central frequency $f_{in}$ and of which the amplitude alternates between a first value and a second value different from the first value;
- an oscillator comprising an electrical supply input coupled to means, or another generator, capable of being controlled by the frequency modulated periodic signal and generating a non-zero voltage for supplying the oscillator only when the amplitude of the frequency modulated periodic signal is equal to the first value or only when the amplitude of the frequency modulated periodic signal is equal to the second value, enabling the oscillator to generate a sinusoidal signal of frequency $f_c>f_{in}$ and comprised in a second frequency band $B_{amp}>B_{in}$, the second frequency band $B_{amp}$ corresponding to the linear variation of the frequency of the frequency modulated radar signal intended to be generated.

In this generator, the device for generating the frequency modulated periodic signal makes it possible to define the modulation envelope of the radar signal. It notably defines the value of the period T and that of $T_{ramp}$, as well as the first frequency band $B_{in}$ over which the instantaneous frequency of the frequency modulated periodic signal varies. The oscillator and the means controlled by the frequency modulated periodic signal next generate a sinusoidal signal in the second frequency band $B_{amp}$ desired for the radar signal and over which the frequency modulated periodic signal is applied as envelope signal via the control of the electrical supply of the oscillator or the controlled interruption of the output of the oscillator. Thus, the oscillator delivers at the output the frequency modulated radar signal of which the frequency varies linearly over the whole second frequency band $B_{amp}$ which is greater than $B_{in}$, while conserving the envelope properties conferred by the frequency modulated periodic signal, notably the values of the period T and the duration $T_{ramp}$.

Thus, this generator makes it possible to generate a radar signal of which the instantaneous frequency varies linearly over a wide frequency band $B_{amp}$ and for a short duration $T_{ramp}$.

Due to the fact that the frequency modulated periodic signal which defines the modulation envelope of the radar signal is generated upstream of the oscillator and controls the supply of the oscillator, this makes it possible to obtain at the output of the oscillator a radar signal of which the instantaneous frequency varies linearly over a wide frequency band $B_{amp}$ and for a short duration $T_{ramp}$. Such a result could not be obtained if for example the frequency modulated periodic signal was used to cut periodically an output of an oscillator generating a periodic signal of which the frequency varies linearly over the desired radar frequency band.

In a simplified manner, the radar signal which is generated may be expressed by the relationship $x(t)=[\cos(2\pi f_{bb}t)\cdot\Pi(t/T)]*III_T(t)$, with $f_{bb}$ the base band frequency of the signal generated by the oscillator, III being a Dirac comb, $\Pi(t/T)$ a rectangular function and T the constant period of the periodic signal controlling the supply of the oscillator.

According to a first embodiment, the device for generating the frequency modulated periodic signal may comprise:
- a device for generating a first periodic signal of period T corresponding, over the part $T_{ramp}$ of the period T, to a sinusoidal signal of which the instantaneous frequency varies linearly over the whole first frequency band $B_{in}$;
- a device for converting the first periodic signal into the frequency modulated periodic signal such that the amplitude of the frequency modulated periodic signal is equal to the first value when the value of the first periodic signal is strictly greater than 0 and is equal to the second value when the value of the first periodic signal is strictly less than 0.

In this first embodiment, the device for generating the first periodic signal may comprise a first voltage controlled oscillator.

This first embodiment is well suited to producing a generator of a frequency modulated radar signal with very low consumption because thanks to the rapid start-up of the voltage controlled oscillator generating the first periodic signal, the settling phase of the generator is very short (for example less than 10 ns), which makes it possible to maximise the duration $T_{stop}$ during which the generator may be switched off. With this first embodiment, it is for example possible to obtain a frequency modulated radar signal of which the duty cycle D is less than or equal to 0.1%.

In this first embodiment, the device for converting the first periodic signal may comprise a frequency locked loop (FLL) including a ring oscillator.

According to a second embodiment, the device for generating the frequency modulated periodic signal may comprise at least one resonator device of which an output is electrically coupled to a phase locked loop (PLL), the frequency modulated periodic signal being intended to be obtained at the output of a second voltage controlled oscillator of the phase locked loop.

This second embodiment is well suited to producing a generator of a frequency modulated radar signal having very good linearity thanks to the use of the phase locked loop, which makes it possible to produce a generator of a radar signal at high signal to noise ratio. The generator according to this second embodiment is also well suited to supplying, during a given period T, a frequency modulated radar signal of which the instantaneous frequency varies linearly several times, consecutively, over the frequency band $B_{amp}$.

The frequency modulated periodic signal may have a zero value over a second part of the period T different from the part $T_{ramp}$. Thus, the generator may be switched off over a part of each period T, making it possible to reduce the electrical consumption of the generator.

The second value of the frequency modulated periodic signal may be zero.

The value of the first frequency band $B_{in}$ may be comprised between 1% and 2% of a frequency $f_{in}$ on which the first frequency band is centred.

The oscillator may correspond to a third voltage controlled oscillator of which the free oscillation range includes the frequency $f_c$ of which the value is a function of that of a control voltage intended to be applied at the input of the third voltage controlled oscillator.

The means capable of being controlled by the frequency modulated periodic signal may comprise at least one switch coupled to the electrical supply input of the oscillator or to the output of the oscillator.

The generator of a frequency modulated radar signal may further comprise at least one injection locked oscillator (ILO) intended to receive at the input a signal delivered on the output of the oscillator and to be locked at least periodically at a frequency $f_{ILO}=k \cdot f_{in}$, with k an integer greater than 1, the value of $f_{ILO}$ being, among the different values multiples of $f_{in}$, that which is the closest to the value of the frequency $f_c$. Such an injected locked oscillator makes it possible to carry out a filtering of the signal delivered on the output of the oscillator in order to eliminate or reduce the components of the signal not lying within the desired frequency band for the frequency modulated radar signal.

The elements of the generator may be produced on an electronic chip, for example in the form of an integrated circuit.

BRIEF DESCRIPTION OF THE DRAWINGS

The present invention will be better understood on reading the description of exemplary embodiments given for purely indicative purposes and in no way limiting and by referring to the appended drawings in which.

Identical, similar or equivalent parts of the different figures described hereafter bear the same numerical references in order to make it easier to go from one figure to the other.

The different parts shown in the figures are not necessarily represented according to a uniform scale, in order to make the figures more legible.

The different possibilities (alternatives and embodiments) should be understood as not being mutually exclusive and may be combined with each other.

DETAILED DESCRIPTION OF PARTICULAR EMBODIMENTS

A generator 100 of a frequency modulated radar signal according to a first embodiment is described below and schematically shown in FIG. 3.

In this first embodiment, the frequency modulated radar signal generated has a duty cycle D less than 1.

The generator 100 comprises a device 102 for generating a first periodic signal x(t) of period T corresponding, over the part $T_{ramp}$ of the period T, to a sinusoidal signal of which the instantaneous frequency varies linearly in a first low frequency band $B_{in}$ centred on a central frequency $f_{in}$. The first signal x(t) linearly modulated in frequency may be expressed by the following equation:

$$x(t) = \begin{cases} \sin(2\pi(f'_{in}t + \alpha t^2)), & \text{for } t \in [0, T_{ramp}] \\ 0, & \text{for } t \notin [0, T_{ramp}] \end{cases}$$

The slope of the ramp formed by the variation of the instantaneous frequency of the signal x(t) over time is characterised by the parameter $\alpha=B_{in}/(2 \cdot T_{ramp})$. The frequency $f'_{in}=f_{in}-\alpha \cdot T_{ramp}$ corresponds to the instantaneous frequency of the signal x(t) at the start of the ramp. The first frequency band $B_{in}$ corresponds to a frequency band of which the values are situated around one to several percent compared to the central frequency $f_{in}$, advantageously between around 1% and 2% of $f_{in}$. Generally speaking, the value of $B_{in}$ is advantageously comprised between around several tens of MHz, or for example between 10 MHz and 90 MHz, and the value of $f_{in}$ is advantageously comprised between around several hundred MHz and several GHz, for example between 100 MHz and 10 GHz. The value of $T_{ramp}$ is for example less than 250 ns. Moreover, in this first embodiment, the value of $T_{transitory}$ is less than 10 ns and that of $T_{stop}$ is greater than or equal to 1 ms.

Figure 4:
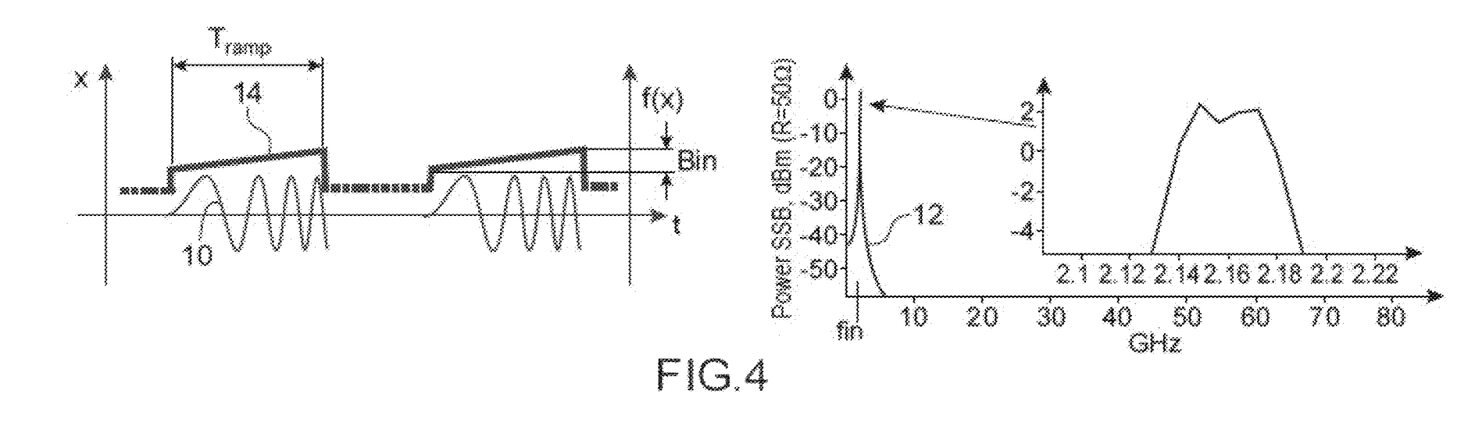
FIG. 4 schematically shows the first signal x(t) in the temporal domain and in the frequency domain, as well as the evolution in the temporal domain of the instantaneous frequency of this first signal.

FIG. 4 schematically shows the first signal x(t) in the temporal domain (curve designated by the reference 10) and in the frequency domain (spectrum designated by the reference 12), as well as the evolution in the temporal domain of the instantaneous frequency of this first signal x(t) (curve designated by the reference 14, and which includes the ramp formed by the variation of the instantaneous frequency of this first signal during $T_{ramp}$). In FIG. 4, the durations $T_{stop}$ and $T_{transitory}$ are not shown.

According to a particular exemplary embodiment, the spectrum of the first signal x(t) is centred on the central frequency $f_{in}$=2.16 GHz. The first frequency band $B_{in}$ of this first signal x(t) is equal to 43.2 MHZ, that is to say $0.02 \cdot f_{in}$.

Figure 3:
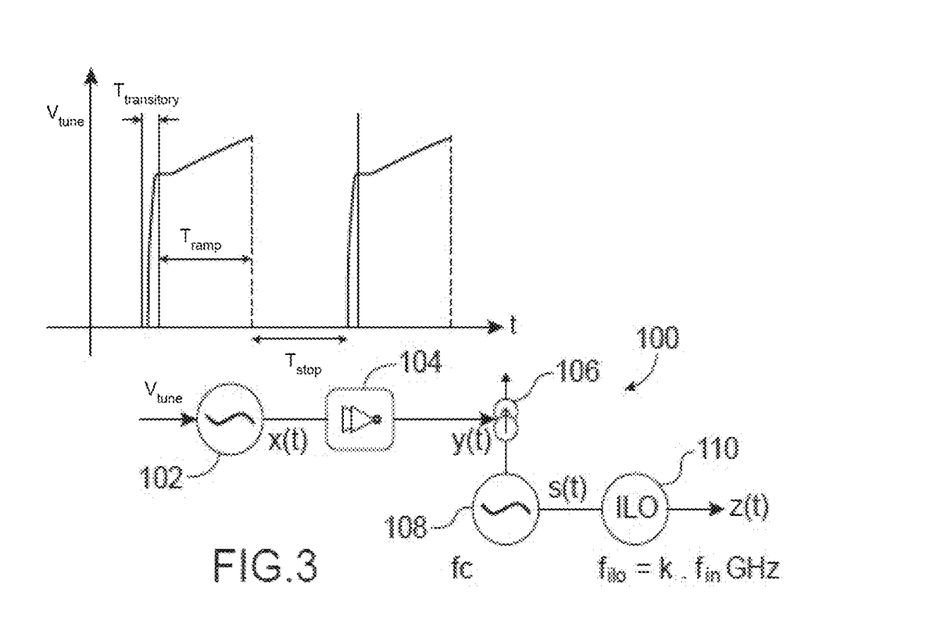
FIG. 3 schematically shows a generator of a frequency modulated radar signal according to a first embodiment.

In this first embodiment, the device 102 corresponds for example to a voltage controlled oscillator (designated "$V_{tune}$" in FIG. 3). The variation of the instantaneous frequency of the first signal x(t) is in this case obtained by varying the amplitude of the control voltage applied at the input of this voltage controlled oscillator.

An example of control voltage $V_{tune}$ is shown in FIG. 3. The duration necessary for the signal $V_{tune}$ to reach the desired voltage level corresponds to the duration $T_{transitory}$ during which the signal x(t) has not yet reached the desired frequency (which corresponds to the lower limit frequency of the first frequency band $B_{in}$). The amplitude of the signal $V_{tune}$ varies next for the duration $T_{ramp}$, which leads to variation of the instantaneous frequency of the first signal x(t) over the whole first frequency band $B_{in}$. The value of the control voltage $V_{tune}$ is next zero over the whole duration $T_{stop}$. The values of $T_{transitory}$, $T_{ramp}$ and $T_{stop}$ are thus parameters defined by the shape of the control signal $V_{tune}$ and are found in the first signal x(t).

This first signal x(t) is next converted into a signal intended to serve as envelope signal for a frequency modulation. To do so, the device 100 comprises a device 104 for converting the first periodic signal x(t) into a second periodic and frequency modulated signal, called y(t). The second signal y(t) has an amplitude equal to a first value when the value of the first periodic signal x(t) is strictly greater than 0 and has a second value, different from the first value, when the value of the first periodic signal x(t) is strictly less than 0. The first value may correspond to a high state (for example equal to the value of a supply voltage of the device 100) symbolized for example by the value 1 and the second value may correspond to a low state (for example equal to the value of a reference potential such as that of the earth of the device 100) symbolized for example by the value 0. In this case, the signal y(t) may be such that:

$$y(t) = \begin{cases} y = 1, x > 0 \\ y = 0, x < 0 \end{cases}$$

The signal y(t) corresponds to a periodic signal and frequency modulated over the part $T_{ramp}$ of the period T. Over the part $T_{ramp}$, the signal y(t) corresponds to a square signal of which the instantaneous frequency varies linearly in the first frequency band $B_{in}$ and of which the amplitude is equal to the first value or to the second value.

The second signal y(t) is intended to serve as signal for switching on and for stopping a current source 106 electrically supplying an oscillator 108. The current source 106 controls the phases of starting and stopping the oscillator 108.

The pulses corresponding to the passages from the second value to the first value of the amplitude of the second signal y(t) form, for the current source 106 and the oscillator 108, start-up times $t_{start}(n)$ corresponding to a discrete and countable set, for a finite duration ramp. In the general case, these times are given by the relationship:

$$t_{start}(n) = \frac{f'_{in} T_{ramp}}{B_{in}} \left( -1 + \sqrt{1 + \frac{B_{in}}{f'_{in} T_{ramp}}(2n-1)} \right), n \in \mathbb{N}$$

This relationship corresponds to one of the solutions of the ordinary quadratic equation of the phase of the first signal x(t):

$$\alpha t^2 + f'_{in} t - m = 0 \text{ with } m=2n-1 \text{ and } n \in \mathbb{N}$$

These times make it possible to define the second signal y(t) such that:

$$y(t) = \sum_n^{nmax} \prod \left( \frac{t - t_{start}(n) - T(n)/2}{T(n)/2} \right)$$

where $\Pi$ shows the rectangular function, over the interval $T(n)=(t_{start}(n+1)-t_{start}(n))/2$.

The value nmax defines the index of the final period of the second signal y(t) in the sequence. This value corresponds to the limit:

$$nmax = \arg \max_{n \in \mathbb{N}} t_{start}(n), \text{such that } t_{start}(n) < T_{ramp}.$$

Figure 5:
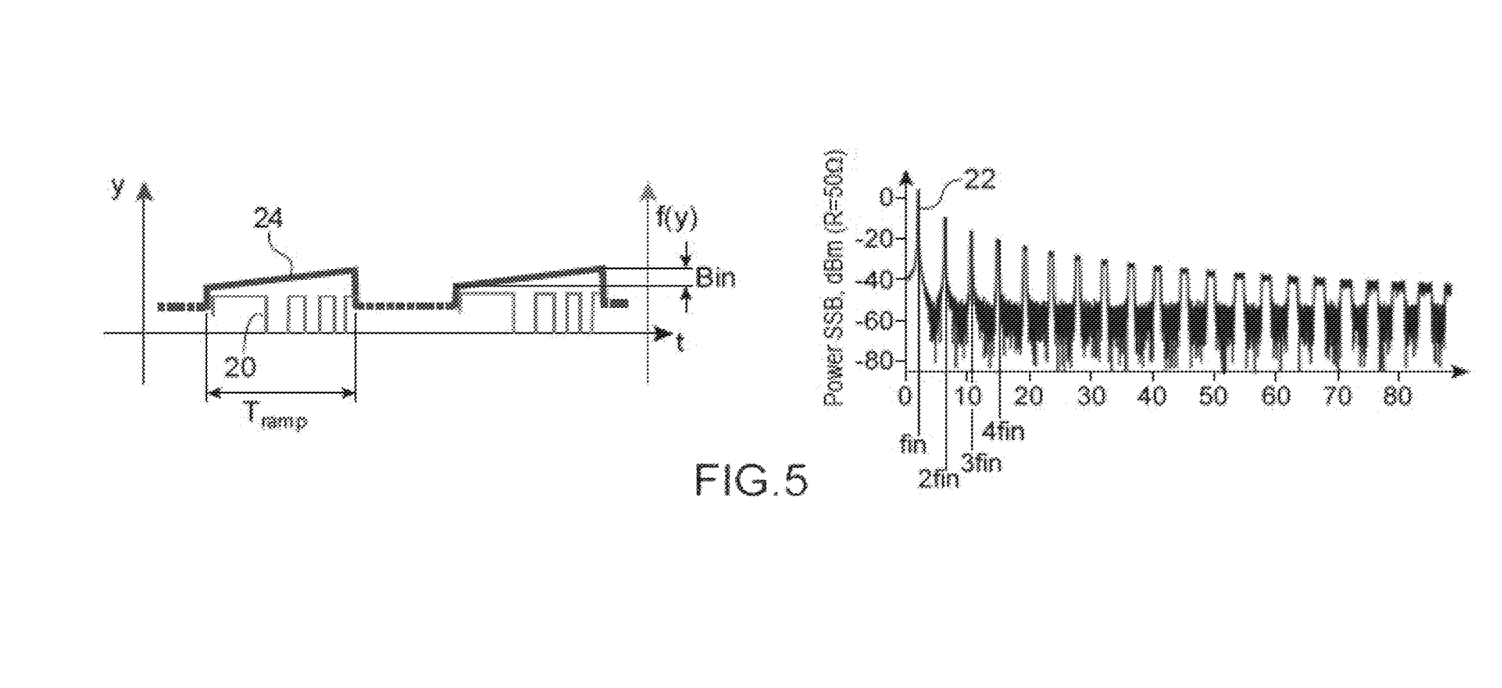
FIG. 5 schematically shows the second signal y(t) in the temporal domain and in the frequency domain, as well as the evolution in the temporal domain of the instantaneous frequency of this second signal y(t)

FIG. 5 schematically shows the second signal y(t) in the temporal domain (curve designated by the reference 20) and in the frequency domain (spectrum designated by the reference 22), as well as the evolution in the temporal domain of the instantaneous frequency of this second signal y(t) (curve designated by the reference 24 and which includes the ramp formed by the variation of the instantaneous frequency of this second signal during $T_{ramp}$). In FIG. 5, the durations $T_{stop}$ and $T_{transitory}$ are not shown.

The values of $T_{transistory}$, $T_{ramp}$ and $T_{stop}$ in the first signal x(t) are similar in the second signal y(t).

The frequency diagram of the second signal y(t) shows that the second signal y(t) includes a continuous signal of fundamental frequency equal to $f_{in}$ (equal to 2.16 GHz in the particular exemplary embodiment described here), and of which the frequency excursion is in addition greatest in sub-bands centred on whole multiples of the frequency $f_{in}$. For example, the $27^{th}$ sub-band, called $B_{in\_27}$ and centred around the frequency 2.16 GHz×27=58.32 GHZ, is 27 times wider than the band $B_{in}$ centred on the frequency $f_{in}$, that is to say $B_{in\_27}$=1.16 GHz. For the $28^{th}$ sub-band $B_{in\_28}$ centred around the frequency 2.16 GHz×28=60.48 GHZ, its width is $B_{in\_28}$=1.20 GHz. Thus, in the spectrum of the second signal y(t), each $i^{th}$ sub-band $B_{in\_i}$ has a central frequency which is equal to i·$f_{in}$ and a band width equal to $B_{in\_i}$=i·$B_{in}$, with i an integer greater than or equal to 1.

The duty cycle, called $\alpha_{dc}$, of the second signal y(t) is for example equal to 0.5. In this case, the spectrum of the second signal y(t) corresponds to the following equation:

$$\mathcal{F}[y](f) = \sum_n^{nmax} \frac{T(n)}{2} \text{sinc}\left(\frac{T(n)}{2}f\right) \cdot e^{-j2\pi f\left(t_{start}(n) + \frac{T(n)}{4}\right)}$$

When the value of the duty cycle $\alpha_{dc}$ is different from 0.5, the spectrum of the second signal y(t) corresponds to the following equation:

$$\mathcal{F}[y](f) = \sum_n^{nmax} \frac{\alpha_{dc}T(n)}{2} \text{sinc}\left(\frac{\alpha_{dc}T(n)}{2}f\right) \cdot e^{-j2\pi f\left(t_{start}(n) + \alpha_{dc}\frac{T(n)}{2}\right)}$$

Figure 6:
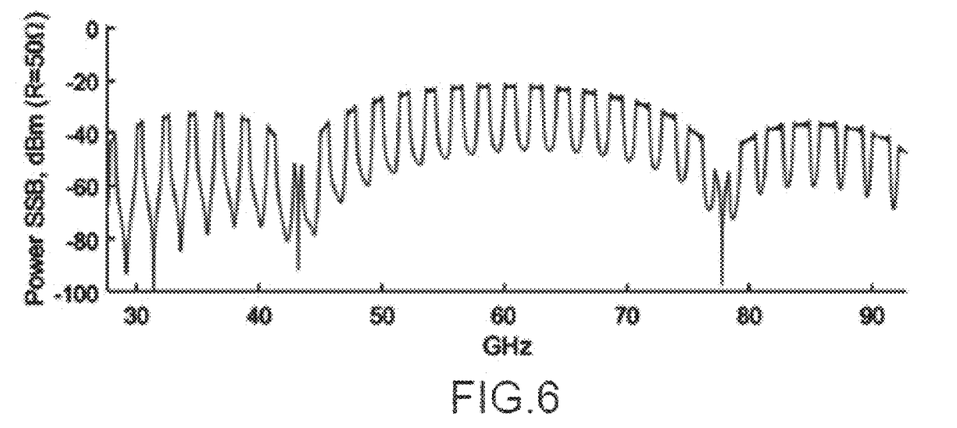
FIGS. 6 to 8 show the spectra of the second signal y(t) when the duty cycle of the second signal $\alpha_{dc}$ is respectively such that $\alpha_{dc}=\frac{1}{8}$, $\alpha_{dc}=\frac{1}{4}$ and $\alpha_{dc}\approx 1$ and less than 1.
Figure 7:
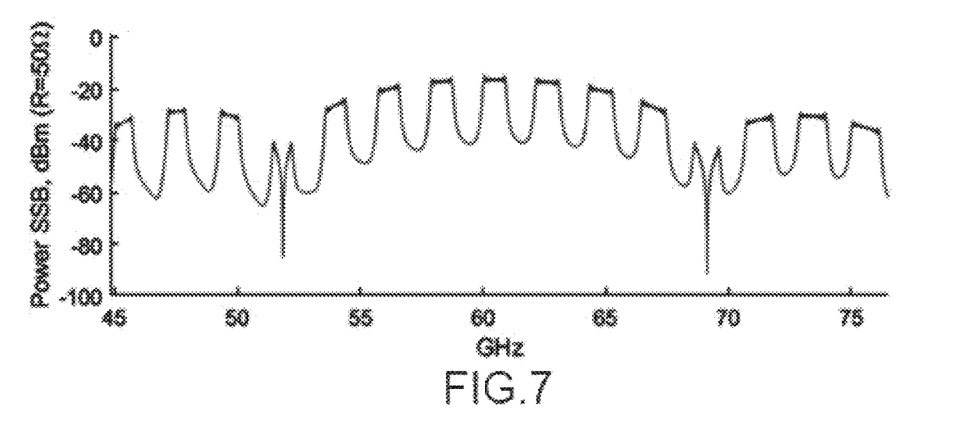
Figure 8:
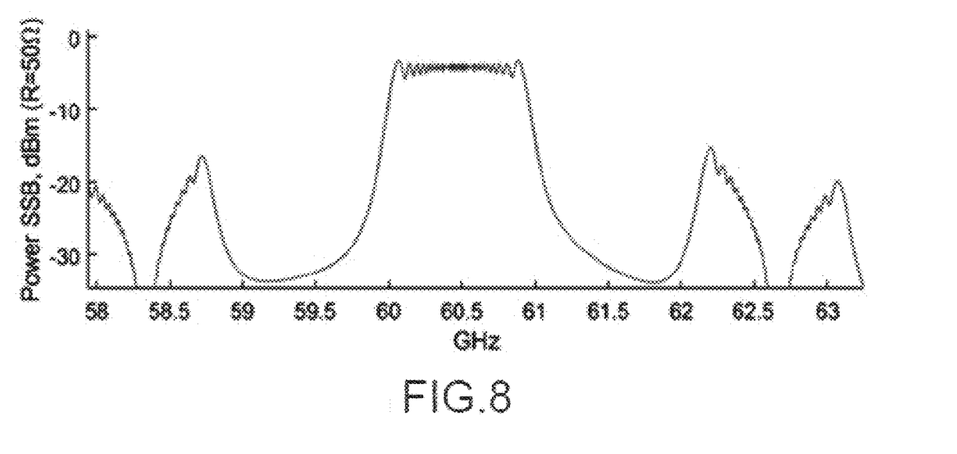

As an example, FIGS. 6 to 8 show the spectra of the second signal y(t) when $\alpha_{dc}$ is respectively such that $\alpha_{dc}$=⅛, $\alpha_{dc}$=¼ and $\alpha_{dc}$≈1 and less than 1.

In the first embodiment, the device 104 comprises a frequency locked loop including a ring oscillator. An exemplary embodiment of such a frequency locked loop is given in the document of C. H. Yen, M. Nasrollahpour, "Low-Power and High-Frequency Ring Oscillator Design in 65 nm CMOS Technology", 2017 IEEE 12th International Conference on ASIC (ASICON).

By controlling the electrical supply of the oscillator 108 by the second signal y(t), this oscillator 108 delivers at the output a sinusoidal signal of frequency $f_c$ corresponding to its free oscillation frequency and modulated by the second signal y(t). The value of the frequency $f_c$ is fixed by the value of a control voltage applied at the input of the oscillator 108, and is chosen such that it forms part of a second frequency band $B_{amp}$ called amplification band and which corresponds to the linear variation of the frequency of the frequency modulated radar signal intended to be generated by the generator 100. Advantageously, the second frequency band $B_{amp}$ may be comprised between 1 GHz and 3 GHz.

The signal obtained at the output of the oscillator 108, called third signal s(t), has the particularity of having its phase locked on that of the second signal y(t).

Such a control of the supply of the oscillator 108 comes down to carrying out an amplification around the frequency $f_c$ and filtering the second signal y(t) in the second frequency band $B_{amp}$ around the central frequency $f_c$ by the cardinal sine sinc $$\text{sinc}\left(\frac{f - f_c}{2f_{in}}\right).$$

The third signal s(t) delivered at the output of the oscillator 108 may be defined by the following equation:

$$s(t) = \sum_n^{nmax} y(t) \cdot \sin(2\pi f_c(t - t_{start}(n))),$$

that is to say $$s(t) = \sum_n^{nmax} \prod\left(\frac{t - t_{start}(n) - T(n)/4}{T(n)/2}\right) \cdot \sin(2\pi f_c(t - t_{start}(n))),$$

The third signal s(t) corresponds to a finite sum of sines windowed with a "rectangular" type function designated by the letter "Π", of which each rectangular period is defined by T(n)=$t_{start}$(n+1)−$t_{start}$(n).

In the above equation, the sine is a real signal being able to be defined such that:

$$\sin(2\pi f_c(t - t_{start}(n))) = \frac{e^{j2\pi f_c(t - t_{start}(n))} - e^{-j2\pi f_c(t - t_{start}(n))}}{2j}$$

Only considering the positive part, the spectrum of the third signal s(t) may be defined by the following equation:

$$\mathcal{F}[s](f) = \sum_n^{nmax} \frac{T(n)}{2} \text{sinc}\left(\frac{T(n)}{2}(f - f_c)\right) \cdot e^{-j2\pi f\left(t_{start}(n) + T(n)/4\right)} \cdot e^{j2\pi f_c T(n)/4}$$

Figure 9:
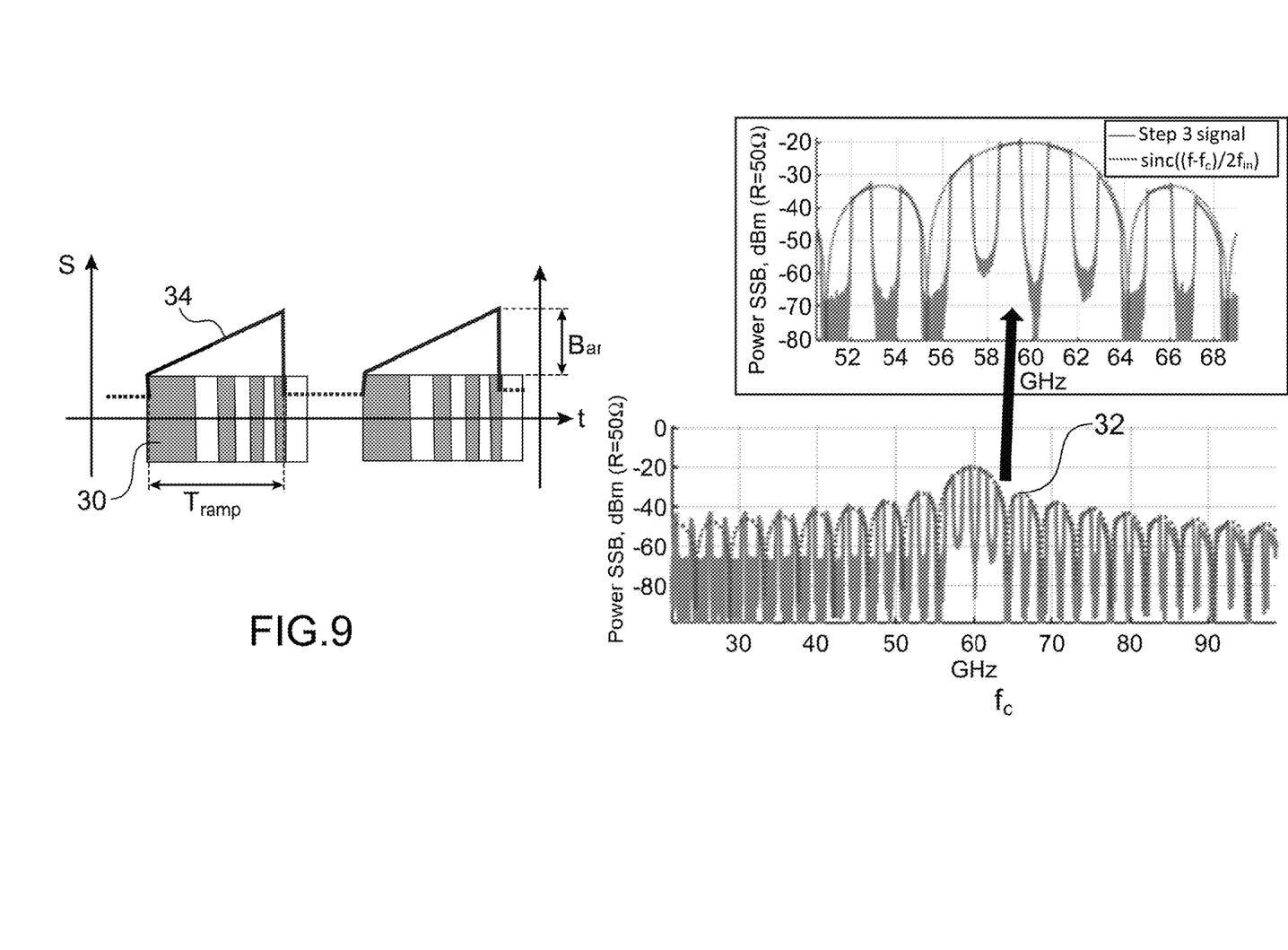
FIG. 9 schematically shows the third signal s(t) in the temporal domain and in the frequency domain, as well as the evolution in the temporal domain of the instantaneous frequency of this third signal s(t)
Figure 10:
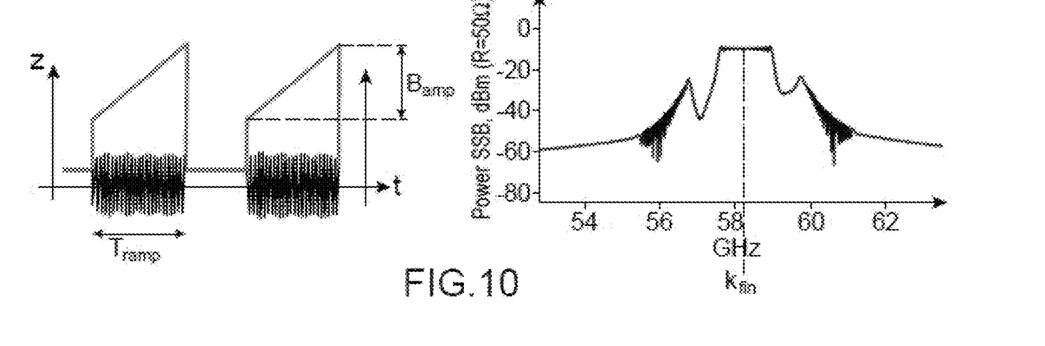
FIG. 10 schematically shows the frequency modulated radar signal delivered by the generator, in the temporal domain and in the frequency domain, as well as the evolution in the temporal domain of the instantaneous frequency of this signal.

FIG. 9 schematically shows the third signal s(t) in the temporal domain (designated by the reference 30) and in the frequency domain (spectrum designated by the reference 32), as well as the evolution in the temporal domain of the frequency of this signal s(t) (designated by the reference 34 and which corresponds to the ramp formed by the variation of the frequency of this signal over time, this ramp being different to that of the first and second signals x(t) and y(t) due to the fact that the frequency band covered by the third signal s(t) corresponds to the second frequency band $B_{amp}$).

From a frequency point of view, the third signal s(t) has a maximum power at the frequency $f_c$, and its envelope corresponds to the cardinal sine $$\text{sinc}\left(\frac{f - f_c}{2f_{in}}\right).$$

The generator 100 also comprises an injection locked oscillator 110, or ILO, receiving at the input the third signal s(t). This ILO 110 filters the third signal s(t) while eliminating the sub-bands adjacent to a band of interest k·$B_{in}$, with k an integer greater than 1, and which makes it possible to produce at the output the frequency modulated radar signal called z(t). This filtering is obtained due to the fact that the ILO 110 locks at the ray of the signal s(t) the closest to its free oscillation frequency. The control signal applied on the control input of the ILO 110 makes it possible to position the free oscillation frequency of the ILO 110 close to k·$f_{in}$ in order to centre the signal delivered by the oscillator 110 exactly on k·$f_{in}$ during the locking of the ILO 110 on the frequency k·$f_{in}$. Returning to the exemplary embodiment described previously, with k=27 and $B_{in}$=43.2 MHz, the band k·$B_{in}$ obtained is equal to 1.16 GHz.

When the generator 100 comprises such an ILO coupled to the output of the oscillator 108, the value of the frequency $f_c$ of the oscillator 108 is chosen such that it is close to the value of a multiple of the frequency $f_{in}$ in order that the filtering carried out by the ILO includes the frequency $f_c$ in the main lobe of the template for filtering carried out by the ILO. For example, when $f_{in}$=2.16 GHZ and when it is desired to obtain a signal in the frequency band corresponding to the $27^{th}$ harmonic of $f_{in}$, the control voltage applied on the oscillator 108 may be such that the value of the frequency $f_c$ is equal to 60 GHz, which is such that 27$f_{in}$<$f_c$<28$f_{in}$.

In the first embodiment described above, the use of an oscillator to produce the device 102 makes it possible to obtain a rapid start-up, and thus to have a low value of $T_{transitory}$, for example less than 10 ns. Due to the fact that the value of $T_{transitory}$ is low, this first embodiment makes it possible to have an important value for the parameter $T_{stop}$, and is thus well suited to maximising the energy saving made by the generator 100.

Figure 11:
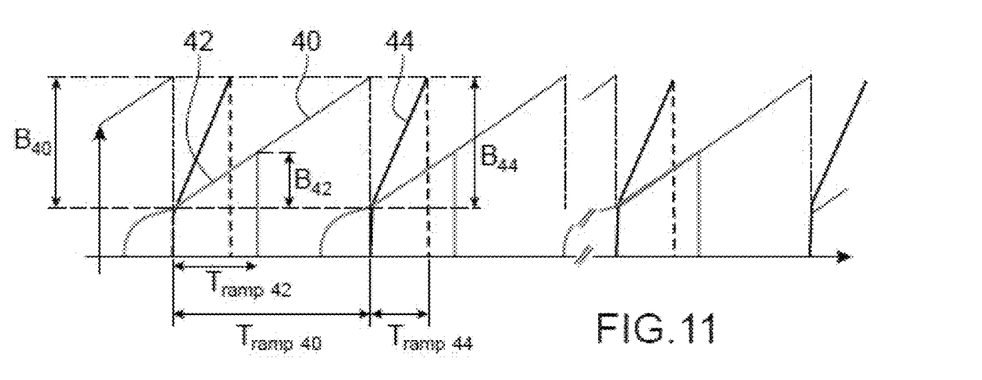
FIG. 11 shows the temporal variations of the instantaneous frequency of frequency modulated radar signals of the prior art as well as that of a frequency modulated radar signal delivered at the output of the generator.

FIG. 11 shows on a same diagram the evolutions in the temporal domain of the frequency of frequency modulated radar signals described previously in FIGS. 1 and 2 (bearing respectively the references 40 and 42) as well as that of the frequency modulated radar signal obtained at the output of the generator 100 (reference 44). The radar signal obtained at the output of the generator 100 makes it possible to scan a wide frequency band (referenced $B_{44}$) in a very short time (referenced $T_{ramp44}$), unlike solutions of the prior art. Thus, the ramp 42, corresponding to that shown in FIG. 1, has an important frequency band $B_{42}$ (here similar to the frequency band $B_{44}$) but it requires, to be covered by the radar signal, an important duration $T_{ramp42}$ much greater than the duration $T_{ramp44}$. In addition, the ramp 40, corresponding to that shown in FIG. 2, has a small frequency band $B_{40}$ (less than the frequency band $B_{44}$) which may be covered with a short duration $T_{ramp40}$ (but which is greater than $T_{ramp44}$).

In the first embodiment described above, the second signal y(t) is obtained by firstly generating the first signal x(t), then by transforming the first signal x(t) to obtain the second signal y(t). According to a second embodiment, it is possible that the generator 100 comprises a device making it possible to generate directly the second signal y(t), without generating beforehand the first signal x(t).

Figure 12:
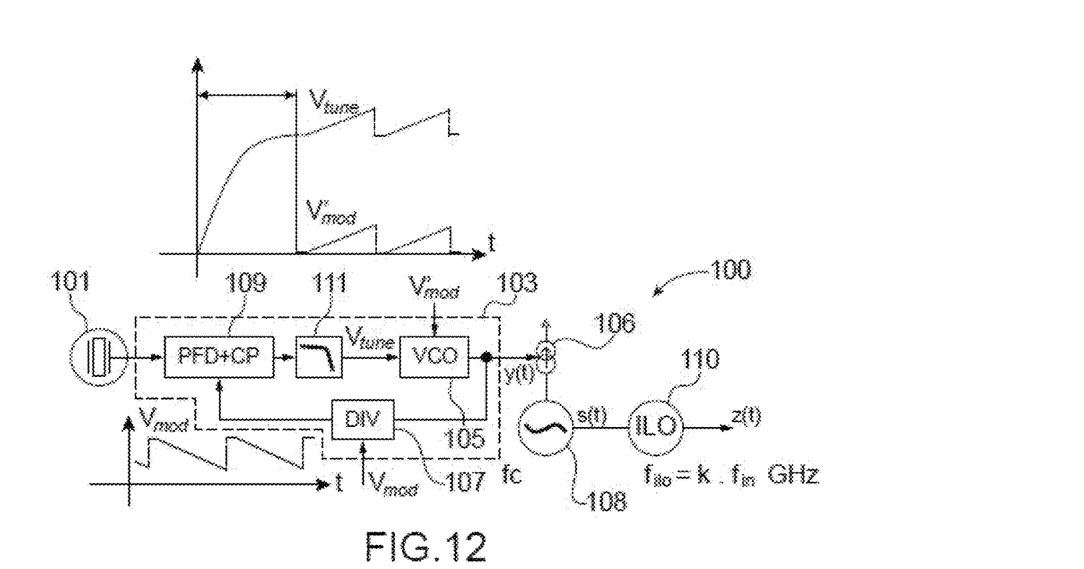
FIG. 12 schematically shows a generator of a frequency modulated radar signal according to a second embodiment.

FIG. 12 shows an exemplary embodiment of the generator 100 according to the second embodiment.

In FIG. 12, the generator 100 comprises a resonator 101 of which an output is electrically coupled to a phase locked loop 103. This loop 103 comprises an oscillator 105 corresponding to a VCO. The loop 103 also comprises a frequency divider 107 capable of dividing the frequency of the signal delivered by the oscillator 105 by a number of which the value is a function of that of a control signal $V_{mod}$ applied at the input of the frequency divider 107. A periodic signal is obtained at the output of the frequency divider 107 which is next compared to a very stable periodic reference signal of frequency supplied by the resonator 101, for example a quartz resonator. The loop 103 also comprises a phase comparator and a charge pump circuit (PFD+CP) 109 generating a signal of output proportional to the difference in phases between the signal delivered by the resonator 101 and that obtained at the output of the frequency divider 107. A filter 111 is interposed between the output of the charge pump circuit and the input of the oscillator 105. In this loop 103, the linear variation of the instantaneous frequency of the signal delivered at the output of the loop 103 is obtained by varying the division ratio applied by the frequency divider 107 thanks to the variation of amplitude of the control signal $V_{mod}$. Another control signal $V'_{mod}$ is applied on the control input of the oscillator 105 in order to stabilise the reaction of the loop 103 to variations in the division ratio.

The frequency excursion of the PLL may be reduced by an important factor corresponding to the multiplication factor k applied to the frequency $f_{in}$. For example, it is sufficient to produce a second signal y(t) with frequency band $B_{in}$ equal to 43.2 MHz to be able to generate at the output of the ILO 110 a radar signal of which the frequency band $B_{amp}$ is greater than 1 GHz for values of k≥27. In this case, when the parameter α of the ramp formed by the second signal y(t) is 173 MHz/µs, that of the ramp formed by the radar signal delivered at the output of the ILO 110 correspond to k.173 MHz/µs, i.e. 4.6 GHz/µs when k=27

The frequency modulated periodic signal y(t) is here obtained at the output of the oscillator 105 of the phase locked loop 103.

The phase locked loop 103 may be produced as described in the document of Cherniak, D. et al., "A 23-GHz Low-Phase-Noise Digital Bang-Bang PLL for Fast Triangular and Sawtooth Chirp Modulation", IEEE Journal of Solid-State Circuits, 2018, 53, (12), pp. 3565-3575.

In this second embodiment, the duration $T_{transistory}$ is longer than that obtained in the first embodiment, and for example comprised between 1 ms and 2 ms. Conversely, compared to the first embodiment, the linearity of the generator 100 is improved, which makes it possible to maximise the SNR on reception of the radar signal generated.

According to a third embodiment of the generator 100, which is an alternative of the $2^{nd}$ embodiment, the phase locked loop 103 is replaced by a circuit for generating a frequency modulated signal produced as described in the patent application FR 3 100 404 A1. The signal delivered by the resonator 101 is then supplied at the input "CLK_IN" of a device such as described in this patent application. One advantage of this circuit for generating a frequency modulated signal is that it makes it possible to generate frequency ramps much more rapidly (frequency varying more rapidly) and more linearly than circuits based on a phase locked loop. Moreover, the settling time of the signal of such a generation circuit is virtually instantaneous, unlike phase locked loops which always have a non-negligible settling time.

In the two embodiments described previously, the signal s(t) is obtained at the output of the oscillator 108 thanks to the control of the electrical supply of the oscillator 108 by the second signal y(t).

In both of the embodiments described previously, the duty cycle $α_{dc}$ of the second signal y(t) is constant. In an alternative, it is possible to vary the value of this duty cycle periodically, for example at each period T. The values of the duty cycle are for example predefined in a memory, as described for example in the document of C. Jany, "Conception et étude d'une synthèse de fréquence innovante en technologies CMOS avancées pour les applications en bande de fréquence millimétrique" (Design and study of an innovative frequency synthesis using advanced CMOS technologies for millimetric frequency band applications), Science Thesis defended in 2014, chapter 4.

In the two embodiments described previously, the generator 100 comprises the ILO 110 making it possible to carry out a filtering of the signal s(t) delivered by the oscillator 108 in order that the radar signal generated does not comprise or comprises few components in the band of frequencies other than that in which the ramp varies. In an alternative, it is however possible that the generator 100 does not comprise this ILO 110. In this case, it is possible to choose the value of the duty cycle $α_{dc}$ of the second signal y(t) as being close to 1 due to the fact that at this value, the spectrum of the second signal y(t) forms secondary bands much more attenuated than the main band of this spectrum (see the spectrum shown in FIG. 8 which corresponds to the case where the duty cycle $α_{dc}$ of the second signal y(t) is close to 1). This alternative may however be applied even when the duty cycle $α_{dc}$ of the second signal y(t) is not close to 1. In this case, the radar signal generated by the generator 100 comprises frequency variations in several different frequency bands, which may be advantageous for certain types of multiband radar.

Generally speaking, the generator 100 makes it possible to obtain the following characteristics:
- frequency band $B_{amp}$ greater than 1 GHz and for example comprised between 1 GHz and 3 GHz;
- duration $T_{ramp}$ comprised between 0.25 µs and 1 µs;
- parameter α of the maximum frequency slope greater than 4 GHz/µs; and
- duration $T_{transitory}$ less than 10 ns when the generator is produced according to the first embodiment.

For all the embodiments and alternatives, the generator 100 may be produced in the form of a single electronic chip, corresponding for example to an integrated circuit.

The invention claimed is:

1. A generator of a frequency modulated radar signal, comprising:
- a first device configured to generate a frequency modulated periodic signal over at least one part $T_{ramp}$ of a period T, corresponding, over said at least one part $T_{ramp}$ of the period T, to a square signal of which the frequency varies linearly in a first frequency band $B_{in}$ of central frequency $f_{in}$ and of which an amplitude alternates between a first value and a second value different from the first value; and
- an oscillator comprising an electrical supply input coupled to a second device configured to be controlled by the frequency modulated periodic signal and generating a non-zero voltage for supplying the oscillator only when the amplitude of the frequency modulated periodic signal is equal to the first value or only when the amplitude of the frequency modulated periodic signal is equal to the second value, wherein the oscillator is configured to, when the oscillator electrical supply input receives the non-zero voltage, generate a sinusoidal signal of frequency $f_c > f_{in}$ and comprised in a second frequency band $B_{amp} > B_{in}$, the second frequency band $B_{amp}$ corresponding to the linear variation of the frequency of the frequency modulated radar signal intended to be generated.

2. The generator of the frequency modulated radar signal according to claim 1, wherein the first device configured to generate the frequency modulated periodic signal comprises:
- a third device configured to generate a first periodic signal of period T corresponding, over the part $T_{ramp}$ of the period T, to a sinusoidal signal of which the frequency varies linearly in the first frequency band $B_{in}$; and
- a fourth device configured to convert the first periodic signal into the frequency modulated periodic signal such that the amplitude of the frequency modulated periodic signal is equal to the first value when the value of the first periodic signal is strictly greater than 0 and is equal to the second value when the value of the first periodic signal is strictly less than 0.

3. The generator of the frequency modulated radar signal according to claim 2, wherein the third device configured to generate the first periodic signal comprises a first voltage controlled oscillator.

4. The generator of the frequency modulated radar signal according claim 2, wherein the fourth device configured to convert the first periodic signal comprises a frequency locked loop including a ring oscillator.

5. The generator of the frequency modulated radar signal according to claim 1, wherein the first device configured to generate the frequency modulated periodic signal comprises at least one resonator device of which an output is electrically coupled to a phase locked loop, the frequency modulated periodic signal being intended to be obtained at the output of a second voltage controlled oscillator of the phase locked loop.

6. The generator of the frequency modulated radar signal according to claim 1, wherein the frequency modulated periodic signal has a zero value over a second part of the period T different from said at least one part $T_{ramp}$.

7. The generator of the frequency modulated radar signal according to claim 1, wherein the second value of the frequency modulated periodic signal is zero.

8. The generator of the frequency modulated radar signal according to claim 1, wherein the value of the first frequency band $B_{in}$ is comprised between 1% and 2% of the central frequency $f_{in}$.

9. The generator of the frequency modulated radar signal according to claim 1, wherein the oscillator is voltage controlled and comprises a free oscillation range including the frequency $f_c$, the frequency $f_c$ being a function of a control voltage intended to be applied at the input of the oscillator.

10. The generator of the frequency modulated radar signal according to claim 1, wherein the second device configured to be being controlled by the frequency modulated periodic signal comprises at least one switch coupled to the electrical supply input of the oscillator or to an output of the oscillator.

11. The generator of the frequency modulated radar signal according to claim 1, further comprising at least one injection locked oscillator configured to receive at an input a signal delivered on an output of the oscillator and to be locked at least periodically at a frequency $f_{ILO} = k \cdot f_{in}$, with k an integer greater than 1, a value of $f_{ILO}$ being, among the different values multiples of that of $f_{in}$, that which is the closest to the value of the frequency $f_c$.

12. The generator of the frequency modulated radar signal according to claim 1, wherein elements of the generator are produced on an electronic chip.

13. The generator of the frequency modulated radar signal according to claim 1, wherein the second device amplifies and filters the frequency modulated periodic signal for input to the electrical supply input.

14. A generator of a frequency modulated radar signal, comprising:
- a first device configured to generate a frequency modulated periodic signal over at least one part $T_{ramp}$ of a period T, corresponding, over said at least one part $T_{ramp}$ of the period T, to a square signal of which the frequency varies linearly in a first frequency band $B_{in}$ of central frequency $f_{in}$ and of which an amplitude alternates between a first value and a second value different from the first value; and
- an oscillator comprising an electrical supply input coupled to a current source configured to be controlled by the frequency modulated periodic signal and electrically supply the oscillator only when the amplitude of the frequency modulated periodic signal is equal to the first value or only when the amplitude of the frequency modulated periodic signal is equal to the second value, wherein the oscillator is configured to, when the oscillator electrical supply input receives the supply from the current source, generate a sinusoidal signal of frequency $f_c > f_{in}$ and comprised in a second frequency band $B_{amp} > B_{in}$, the second frequency band $B_{amp}$ corresponding to the linear variation of the frequency of the frequency modulated radar signal intended to be generated.

* * * * *